United States Patent
Inoue et al.

(10) Patent No.: US 12,241,737 B2
(45) Date of Patent: Mar. 4, 2025

(54) THREE-DIMENSIONAL-MEASURING-APPARATUS INSPECTION GAUGES, THREE-DIMENSIONAL-MEASURING-APPARATUS INSPECTION METHODS AND THREE-DIMENSIONAL MEASURING APPARATUSES

(71) Applicant: MITUTOYO CORPORATION, Kanagawa (JP)

(72) Inventors: Yuto Inoue, Kanagawa (JP); Masayuki Nara, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 357 days.

(21) Appl. No.: 17/974,698

(22) Filed: Oct. 27, 2022

(65) Prior Publication Data
US 2023/0136366 A1   May 4, 2023

(30) Foreign Application Priority Data
Oct. 29, 2021   (JP) .................. 2021-177083

(51) Int. Cl.
G01B 5/008   (2006.01)
G01B 5/012   (2006.01)
G01B 21/04   (2006.01)

(52) U.S. Cl.
CPC .......... *G01B 5/012* (2013.01); *G01B 21/042* (2013.01); *G01B 21/047* (2013.01)

(58) Field of Classification Search
CPC ..... G01B 5/008; G01B 21/042; G01B 21/047
USPC ................................................. 33/1 BB, 502
See application file for complete search history.

(56) References Cited

U.S. PATENT DOCUMENTS

| | | | | |
|---|---|---|---|---|
| 4,364,182 A | * | 12/1982 | Jones | G01B 3/30 73/1.79 |
| 4,889,425 A | * | 12/1989 | Edwards | G01B 11/16 356/400 |
| 4,932,136 A | * | 6/1990 | Schmitz | G01B 21/042 73/1.79 |
| 4,962,591 A | * | 10/1990 | Zeller | G01B 21/042 73/1.79 |
| 5,125,261 A | * | 6/1992 | Powley | G01B 3/30 33/502 |
| 5,778,548 A | * | 7/1998 | Cerruti | G01B 21/042 33/503 |
| 6,023,850 A | * | 2/2000 | Trapet | G01B 21/042 33/502 |
| 6,078,846 A | * | 6/2000 | Greer | G01B 21/042 96/245 |
| 6,192,594 B1 | * | 2/2001 | Wackowski | G01B 3/04 434/188 |

(Continued)

FOREIGN PATENT DOCUMENTS

DE         19720883 A1    11/1998

*Primary Examiner* — George B Bennett
(74) *Attorney, Agent, or Firm* — IGreenblum & Bernstein, P.L.C.

(57) ABSTRACT

A three-dimensional-measuring-apparatus inspection gauge includes a plurality of targets to be measured with which a tip of a probe of a three-dimensional measuring apparatus comes into contact; and a frame member that supports the plurality of targets. The plurality of targets are arranged in positions corresponding to each vertex of a triangular prism.

13 Claims, 14 Drawing Sheets

(56) References Cited

U.S. PATENT DOCUMENTS

| | | | | |
|---|---|---|---|---|
| 6,836,323 B2* | 12/2004 | Schmadel | ............ | G01B 21/042 |
| | | | | 33/558.2 |
| 6,950,250 B2* | 9/2005 | Kousek | ................ | G01C 15/006 |
| | | | | 359/857 |
| 7,296,363 B2* | 11/2007 | Danisch | .................. | G01P 15/18 |
| | | | | 33/503 |
| 8,015,717 B2* | 9/2011 | Piasse | ................. | G01B 21/042 |
| | | | | 33/DIG. 15 |
| 9,459,096 B2* | 10/2016 | Guasco | ................ | G01B 21/045 |
| 9,683,827 B2* | 6/2017 | Wimmer | ............... | G01B 21/042 |
| 10,378,872 B2* | 8/2019 | Sakai | .................... | B23Q 17/00 |
| 11,231,273 B2* | 1/2022 | Meuret | ................ | G01B 21/042 |
| 11,293,745 B2* | 4/2022 | Asanuma | ............... | G01B 7/008 |
| 11,774,227 B2* | 10/2023 | Kiyotani | ............... | G01B 5/0004 |
| | | | | 33/502 |
| 11,781,849 B2* | 10/2023 | Asanuma | ............... | G01B 5/016 |
| | | | | 33/503 |
| 2002/0144416 A1* | 10/2002 | Ghesla | .................. | G02B 5/122 |
| | | | | 33/293 |
| 2003/0070311 A1* | 4/2003 | Zhu | ...................... | G01B 21/042 |
| | | | | 33/502 |
| 2005/0068523 A1* | 3/2005 | Wang | .................. | H04N 13/254 |
| | | | | 356/243.1 |
| 2013/0152412 A1* | 6/2013 | Kumagai | ............ | G01C 15/004 |
| | | | | 33/291 |

\* cited by examiner (A) ELEVATION ANGLE 90°
(B) ELEVATION ANGLE 45°
(C) ELEVATION ANGLE 0°

THREE-DIMENSIONAL-MEASURING-APPARATUS INSPECTION GAUGES, THREE-DIMENSIONAL-MEASURING-APPARATUS INSPECTION METHODS AND THREE-DIMENSIONAL MEASURING APPARATUSES

CROSS-REFERENCE TO RELATED APPLICATIONS

The present application claims priority to Japanese Patent Applications number 2021-177083, filed on Oct. 29, 2021. The contents of this application are incorporated herein by reference in their entirety.

BACKGROUND OF THE INVENTION

There is a conventionally known inspection gauge used when the motion precision of a three-dimensional measuring apparatus is inspected. The inspection gauge has spheres that are provided at positions corresponding to vertices of a triangular pyramid, and are connected by rod-like members provided at positions corresponding to sides of the triangular pyramid (e.g. see the specification of Germany Patent Application Publication No. 19720883).

When a three-dimensional measuring apparatus is inspected by causing a probe of the three-dimensional measuring apparatus to come into contact with spheres of the inspection gauge arranged at vertices of a triangular pyramid of the inspection gauge to thereby measure distances between the spheres. For example, there are three-dimensional measuring apparatuses that perform measurement of an object by using a probe caused to assume such a position that it points vertically downward or such a position that it points a horizontal direction. In the conventional configuration, indicators of the inspections are motion errors of a three-dimensional measuring apparatus that performs measurement with different probe positions, there is problem that the inspection cannot be carried out with high precision with a single three-dimensional-measuring-apparatus inspection gauge.

BRIEF SUMMARY OF THE INVENTION

The present invention has been made in view of these points, and an objective thereof is to enhance the precision of inspection of a three-dimensional measuring apparatus using an inspection gauge.

A three-dimensional-measuring-apparatus inspection gauge according to the present inventions comprises: a plurality of targets to be measured with which a tip of a probe of a three-dimensional measuring apparatus comes into contact; and a frame member that supports the plurality of targets, wherein the plurality of targets are arranged in positions corresponding to each vertex of a triangular prism.

A three-dimensional-measuring-apparatus inspection method according to the present invention, comprises: a step of placing, on mounting surface of a three-dimensional measuring apparatus on which a work is placed, a three-dimensional-measuring-apparatus inspection gauge comprising a plurality of targets to be measured with which a tip of a probe of a three-dimensional measuring apparatus comes into contact; and a frame member that supports the plurality of targets, wherein the plurality of targets are arranged in positions corresponding to each vertex of a triangular prism; a step at which a processor causes the three-dimensional measuring apparatus to measure to-be-measured distances which are distances between a plurality of targets of the three-dimensional-measuring-apparatus inspection gauge; and a step at which the processor determines whether or not there is an anomaly of the three-dimensional measuring apparatus on a basis of whether or not the to-be-measured distances are in a predetermined appropriate range.

A three-dimensional measuring apparatus according to the present invention, comprises: a table; a probe provided to assume variable positions; a moving mechanism that moves the probe; a position indication part that formed on the table, and indicates a placement position for the above three-dimensional-measuring-apparatus inspection gauge; and a control unit that controls a position of the probe, and operation of the moving mechanism so as to measure to-be-measured distances which are distances between a plurality of targets of the three-dimensional-measuring-apparatus inspection gauge placed at the placement position, wherein the control unit performs on a basis of selecting operation for selecting a first inspection mode or a second inspection mode either: first-mode inspection operation in which the to-be-measured distances are measured by causing the probe of the three-dimensional measuring apparatus to come into contact with the plurality of targets while the probe is at a constant position; or second-mode inspection operation in which the to-be-measured distances are measured by causing the probe of the three-dimensional measuring apparatus to come into contact with contact the plurality of targets while the probe is at a plurality of positions.

DETAILED DESCRIPTION OF THE INVENTION

The present inventions will be described below through embodiments of the invention. However, the following embodiments do not limit the claimed invention, and not all combinations of features described in the embodiments are essential to the solution of the invention.

Figure 1:
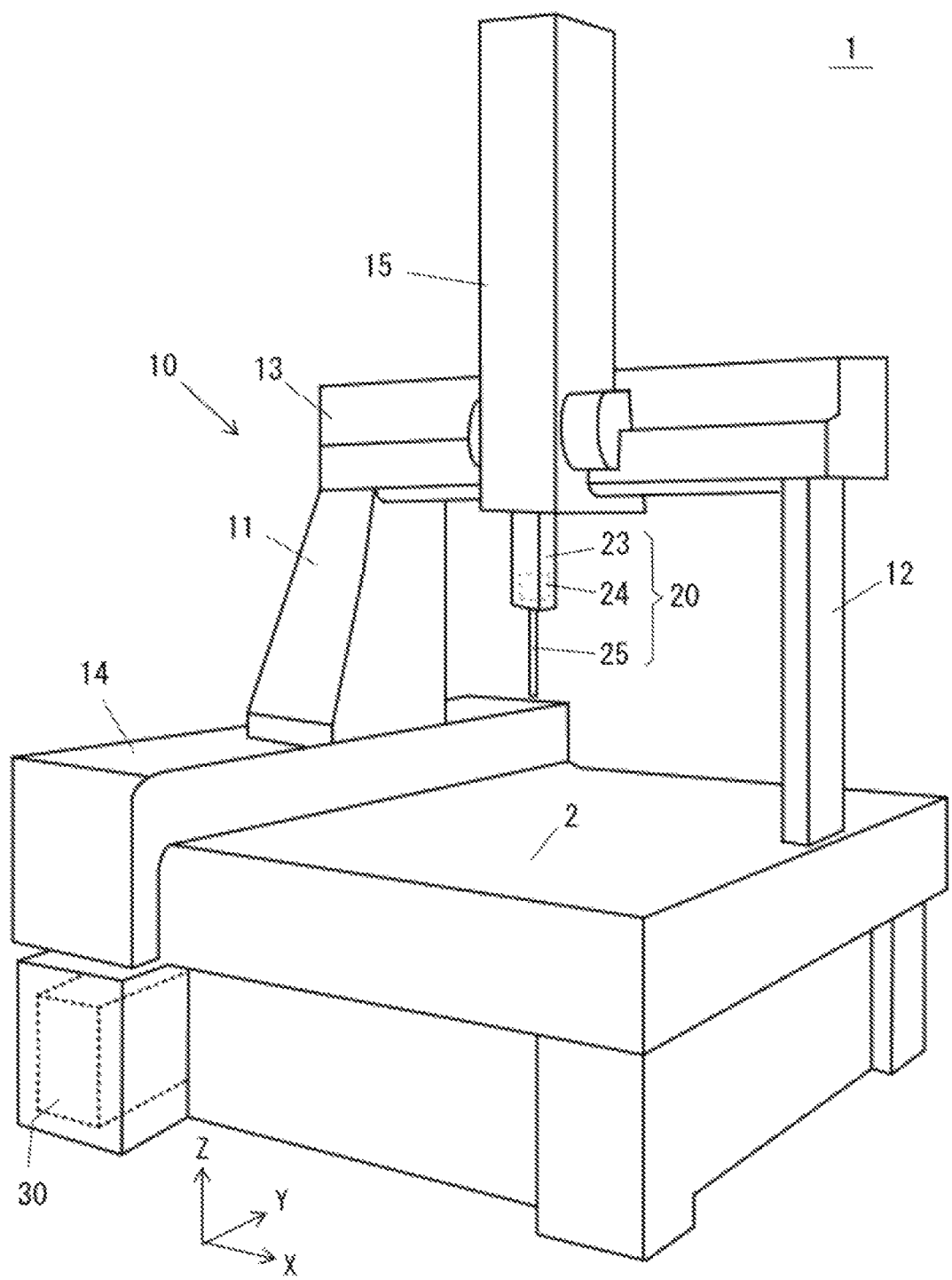
FIG. 1 is a perspective view of a three-dimensional measuring apparatus.
Figure 2:
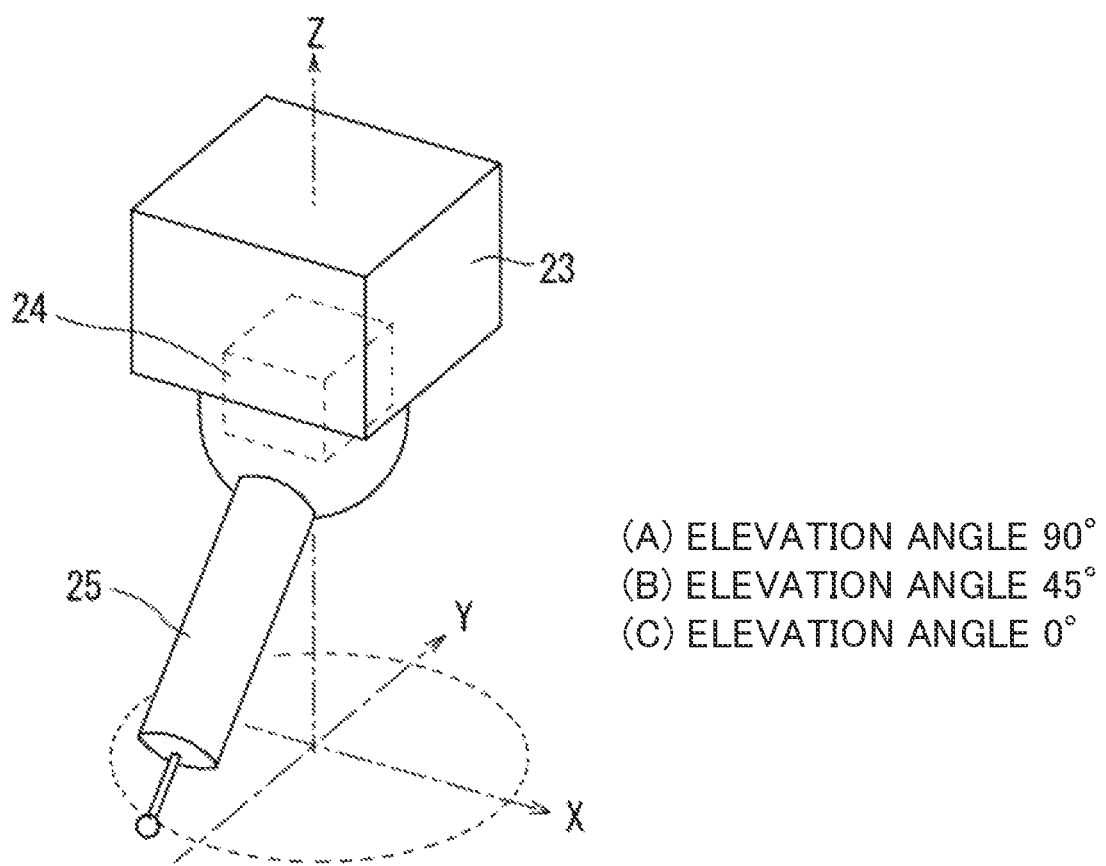
FIG. 2 is a perspective view showing configuration around a probe.

A three-dimensional measuring apparatus and a three-dimensional-measuring-apparatus inspection gauge according to aspects of the present inventions are explained with reference to the figures. FIG. 1 is a perspective view of a three-dimensional measuring apparatus 1. FIG. 2 is a perspective view showing configuration around a probe 25. Although terms representing directions like "upper," "lower," "right" and "left" are used below in accordance with the position of a subject drawn in the figures, these terms are not used with the intension to limit the present inventions.

(Three-Dimensional Measuring Apparatus)

The three-dimensional measuring apparatus 1 includes a table 2, a moving mechanism 10, a probe unit 20 and a control unit 30.

The three-dimensional measuring apparatus 1 is an apparatus that causes the tip of the probe 25 of the probe unit 20 to contact an object to be measured, and measures the shape of the object. When the three-dimensional measuring apparatus 1 performs an inspection, a three-dimensional-measuring-apparatus inspection gauge 50 (hereinafter, referred to as an "inspection gauge 50") is used. Details of the inspection gauge 50 are mentioned later with reference to FIG. 4 and the like.

The table 2 is a table on which a work which is an object is placed, and has a horizontal mounting surface. The mounting surface of the table 2 is provided with a position indication part representing a placement position of the inspection gauge 50.

The moving mechanism 10 has a column 11, a supporter 12, a beam 13, a Y-axis-direction driving section 14 and a slider 15.

The moving mechanism 10 causes each section to operate in accordance with a control signal from the control unit 30. Specifically, the moving mechanism 10 moves the probe unit 20 supported by the slider 15 to thereby move the probe 25 in certain direction in the X-axis direction, the Y-axis direction, and the Z-axis direction in a space above the table 2.

The column 11 and the supporter 12 are support members provided such that they extend upward in the Z-axis direction from the table 2. The beam 13 extends between the column 11 and the supporter 12 in the horizontal direction (the X-axis direction in FIG. 1). The beam 13 has a guide (not shown) for moving the slider 15 in the X-axis direction.

The Y-axis-direction driving section 14 operates in accordance with a control signal from the control unit 30 to move the column 11, the supporter 12 and the beam 13 integrally in the Y-axis direction. The slider 15 is a member supported by the beam 13, and the probe unit 20 is provided at the lower end of the slider 15.

The probe unit 20 has a Z-axis spindle 23, a position changing mechanism 24 and the probe 25.

The Z-axis spindle 23 is configured to move in the Z-axis direction. The Z-axis spindle 23 moves the probe 25 along the Z-axis direction. As shown in FIG. 2, the position changing mechanism 24 is a mechanism for changing the position of the probe 25. The position changing mechanism 24 causes the probe 25 to assume a predetermined position in accordance with a control signal from the control unit 30.

For example, the position changing mechanism 24 causes the probe 25 to assume a position with (A) an elevation angle of 90°, (B) an elevation angle of 45° and (C) an elevation angle of 0°. When the probe 25 is at the position with the elevation angle of 90°, the probe 25 is perpendicular to the Z-axis direction. When the probe 25 is at the position with the elevation angle of 45°, the probe 25 is inclined at an angle of 450 to the Z-axis direction. When the probe 25 is at the position with the elevation angle of 0°, the probe 25 is parallel to the Z-axis direction. For example, the position changing mechanism 24 causes the probe 25 to assume positions at predetermined azimuths relative to the Z axis. For example, 0°, 45°, 90°, 135°, 180°, 225°, 270° and 315° are set as the predetermined azimuths, and the position changing mechanism 24 is configured to cause the probe 25 to be at any of the azimuths. In the present embodiment, as an example, the probe 25 is at the azimuth of 0° when the probe 25 is at a position to point the negative direction of the Y axis as in FIG. 2.

(Control Unit)

Figure 3:
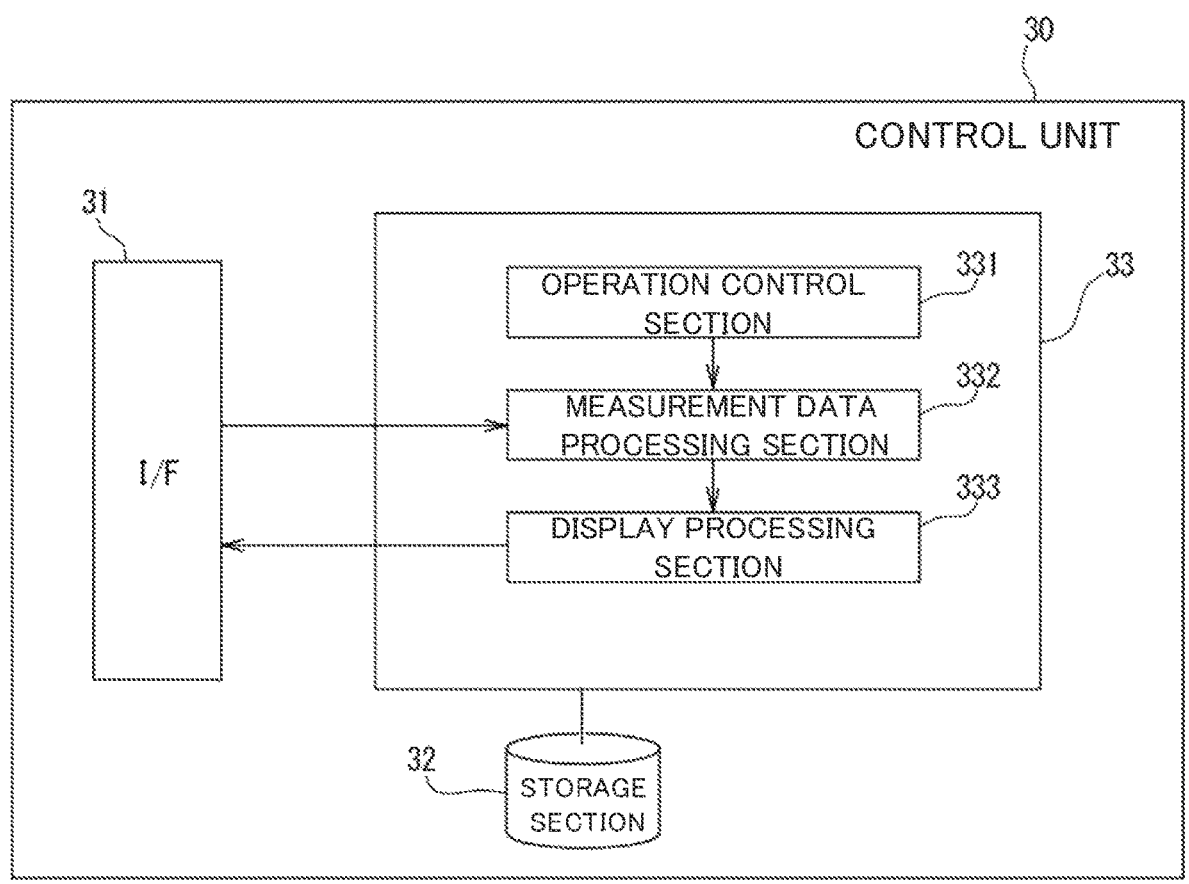
FIG. 3 is a block diagram of a control unit.

FIG. 3 is a block diagram of the control unit 30. The control unit 30 is a unit for controlling operation of each section of the three-dimensional measuring apparatus 1. The control unit 30 has an interface section 31, a storage section 32 and a control section 33.

The interface section 31 is an interface for acquiring data obtained by measurement by the probe 25, outputting measurement results to an external display section (not shown), and receiving predetermined operation input from an operator, and so on. For example, the interface section 31 receives an instruction by selecting operation of an operator for selecting an inspection mode of the three-dimensional measuring apparatus 1.

The storage section 32 is a storage medium that stores various types of data, and has a ROM (Read Only Memory), a RAM (Random Access Memory), a hard disk and the like. The storage section 32 has stored thereon various types of operating program for causing the three-dimensional measuring apparatus 1 to operate. The storage section 32 has stored thereon information about a first inspection mode and a second inspection mode.

The "first inspection mode" is a mode for a simple inspection of the three-dimensional measuring apparatus 1, and this inspection is implemented in a state where the probe 25 is at a position with the elevation angle of 0°, for example. The storage section 32 has stored thereon data, as information about the first inspection mode, representing in which order and along which path the probe 25 is moved relative to a plurality of spheres T1 to T6 (details are mentioned later) of the inspection gauge 50.

In the simple inspection, the three-dimensional measuring apparatus 1 moves the probe 25 at a position with the elevation angle of 0° (pointing downward in the Z-axis direction), and measurement is performed by causing the tip of the probe 25 to contact the spheres T of the inspection gauge 50. Specifically, the three-dimensional measuring apparatus 1 measures representative points of the spheres T (e.g. the center coordinates of the sphere T). The simple inspection can be implemented in a shorter time than a detailed inspection described below, and so is used as a daily inspection.

The "second inspection mode" is a mode for a detailed inspection of the three-dimensional measuring apparatus 1, this inspection is implemented while the position of the probe 25 is changed to several positions, and the motion error precision of the three-dimensional measuring apparatus 1 is measured. For example, scale errors, and motion errors related to squareness, rolling, pitching and yawing are measured. The storage section 32 has stored thereon data, as information about the second inspection mode, representing at which position, in which order and along which path the probe 25 is moved relative to the spheres T1 to T6 of the inspection gauge 50.

For example, in the detailed inspection, measurement of the six spheres T1 to T6 is performed while the probe 25 is at a predetermined direction, thereafter the of the probe 25 is changed to another direction, and measurement of the six spheres T1 to T6 is performed again in that state. In this manner, in the detailed inspection, measurement of the spheres T is performed with a plurality of directions of the probe 25. If the number of directions of the probe 25 is too small, inspections with high precision cannot be implemented, whereas if the number directions of the probe 25 is too large, inspections take a long time. It is possible to set the number of set directions of the probe 25 freely. For example, the set directions may include all three directions, the elevation angle of 0°, the elevation angle of 45° and the elevation angle of 90°, and the directions with the elevation angle of 45° and the elevation angle of 90° may include positions with two azimuths or more.

For example, the control section 33 is a processor which is a CPU (Central Processing Unit). By executing an operating program stored on the storage section 32, the control section 33 functions as an operation control section 331, a measurement data processing section 332 and a display processing section 333.

The operation control section 331 has a functionality of causing the three-dimensional measuring apparatus 1 to perform a normal measurement mode of causing each section of the three-dimensional measuring apparatus 1 to operate and performing measurement of an object placed on the table 2. On the basis of the information about the first inspection mode stored on the storage section 32, the operation control section 331 causes the three-dimensional measuring apparatus 1 to perform inspection operation in the first inspection mode for the simple inspection. The operation control section 331 causes the three-dimensional measuring apparatus 1 to perform inspection operation in the second inspection mode for the detailed inspection on the basis of the information about the second inspection mode stored on the storage section 32.

The measurement data processing section 332 has a functionality of processing data obtained by the measurement using the probe 25, and of generating coordinate information and distance information about an object. For example, the measurement data processing section 332 determines whether or not to-be-measured distances which are distances between the plurality of spheres T are within a predetermined appropriate range.

In a case that it is determined as a result of the measurement in the first inspection mode (simple inspection) that the to-be-measured distances are not within the predetermined appropriate range, for example, the operation control section 331 may control operation of each section of the three-dimensional measuring apparatus 1 such that the inspection mode automatically switches to the second inspection mode (detailed inspection).

For example, the display processing section 333 causes the display section which is not shown to display a user interface for an operator to perform predetermined input operation. In addition, for example, the display processing section 333 causes the display section to display information about measurement results. Specifically, in inspection, the display processing section 333 provides a user interface for an operator to select either the "first inspection mode (simple inspection)" or the "second inspection mode (detailed inspection)." For example, if the to-be-measured distances, which are the measurement results, are not within the predetermined appropriate range, the display processing section 333 causes the display section to display information to that effect.

The three-dimensional measuring apparatus 1 configured as above implements measurement operation in a conventional manner for measuring an object. On the other hand, when performing an inspection, the three-dimensional measuring apparatus 1 uses the inspection gauge 50 according to the present embodiment and implements inspection operation in either inspection mode in accordance with an instruction for the "first inspection mode (simple inspection)" or the "second inspection mode (detailed inspection)" input from an operator.

(Three-Dimensional-Measuring-Apparatus Inspection Gauge)

Figure 4:
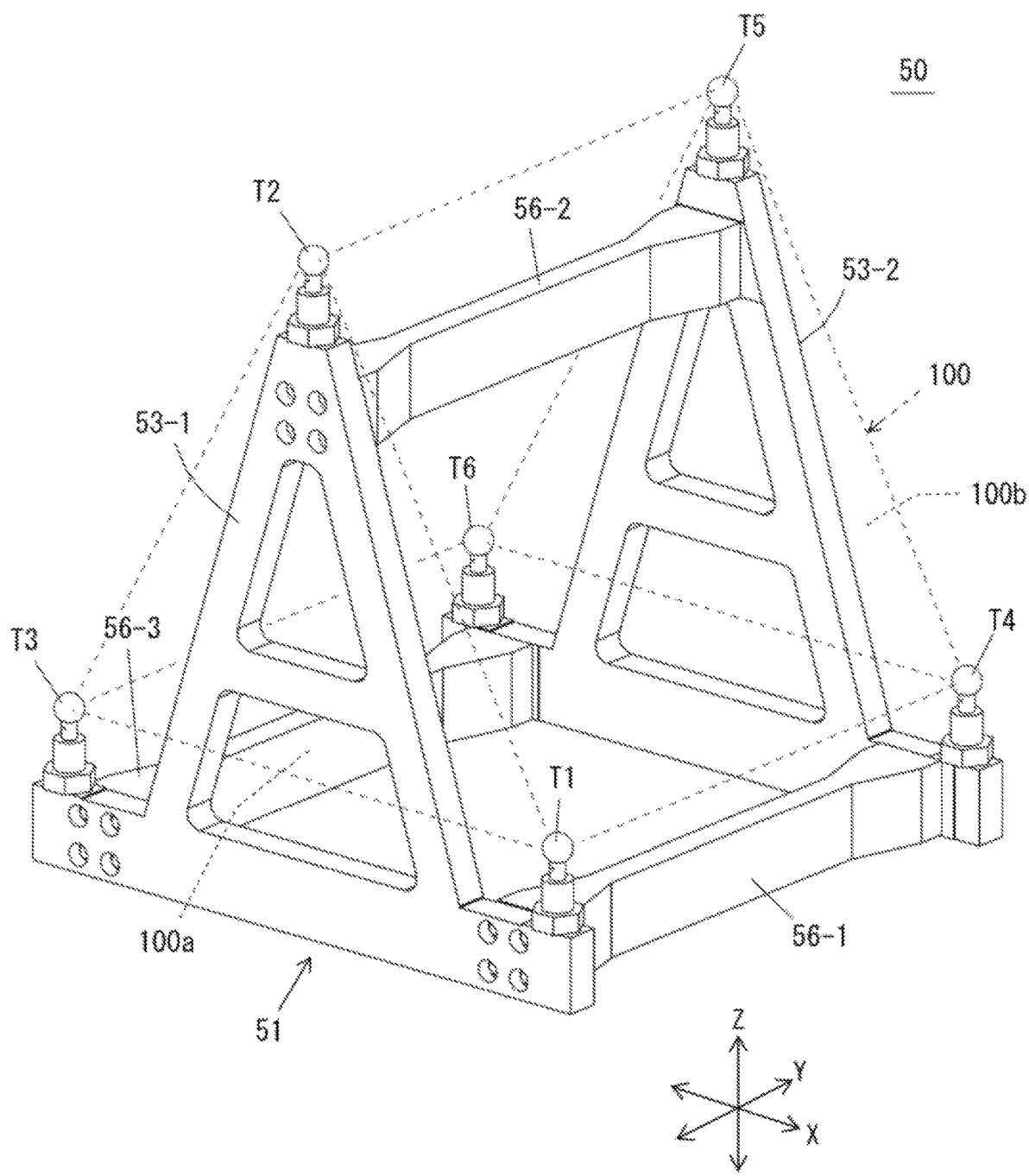
FIG. 4 is a perspective view showing the appearance of an inspection gauge.
Figure 5:
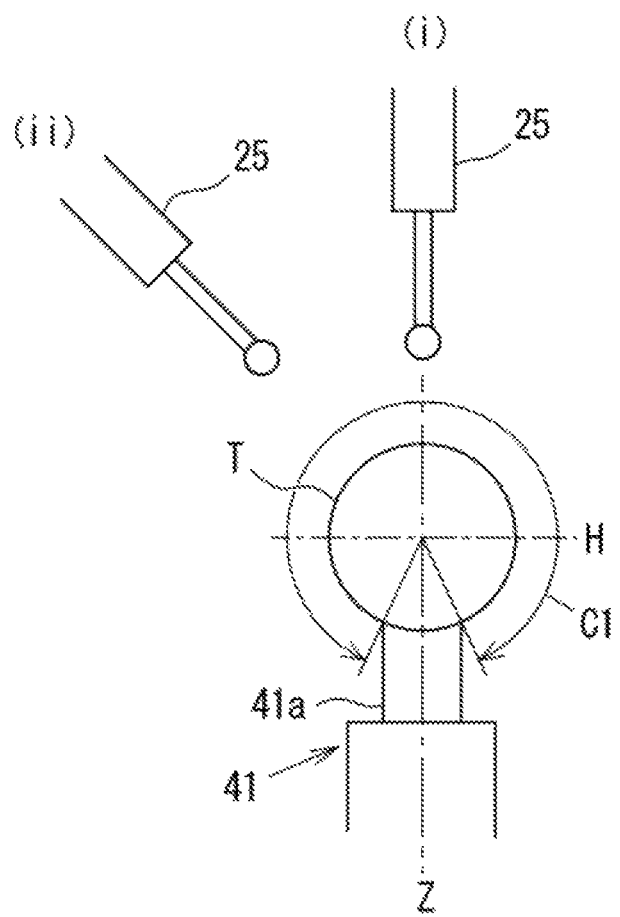
FIG. 5 is a figure for explaining a sphere.
Figure 6:
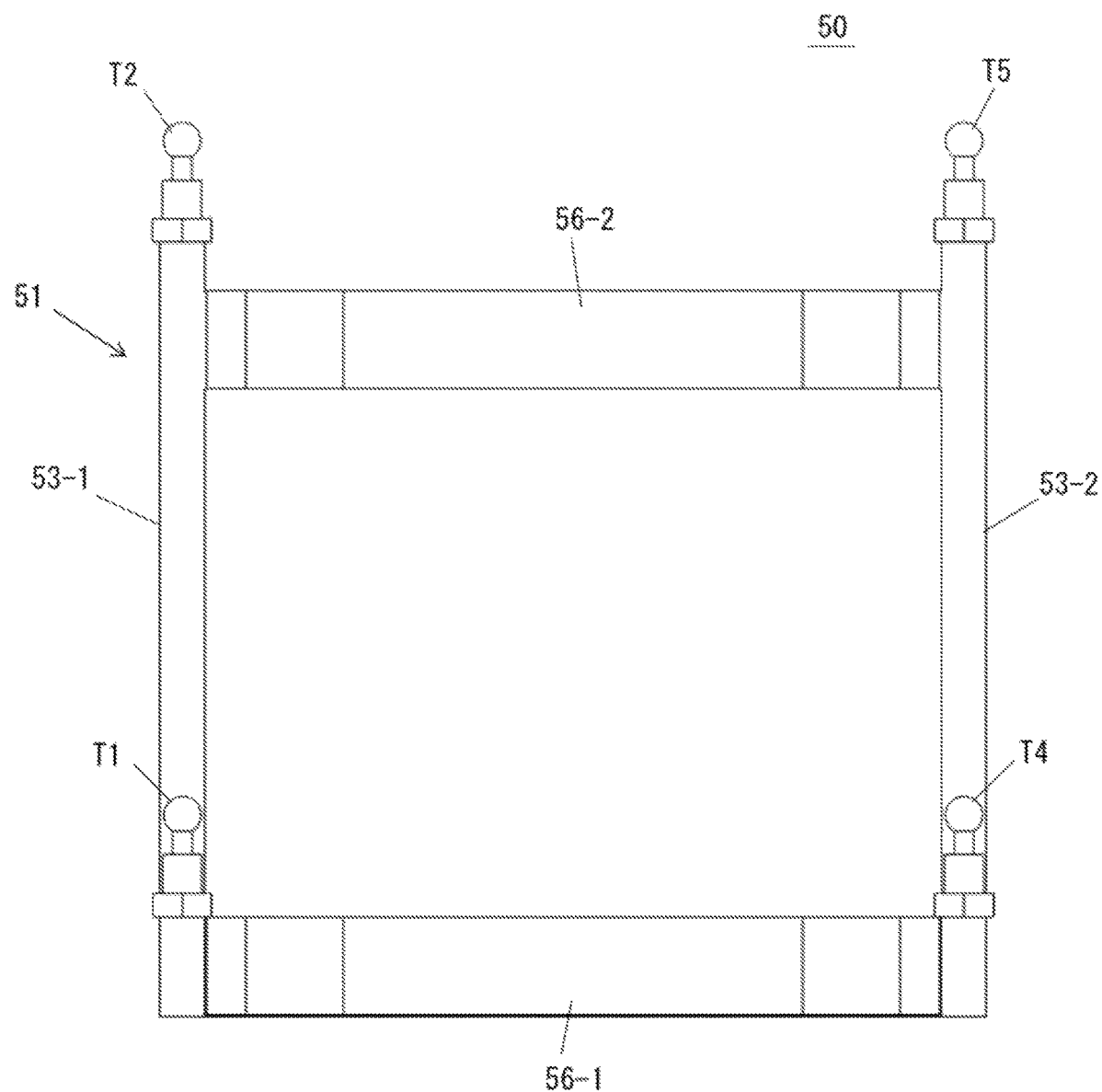
FIG. 6 is a front view of the inspection gauge.
Figure 7:
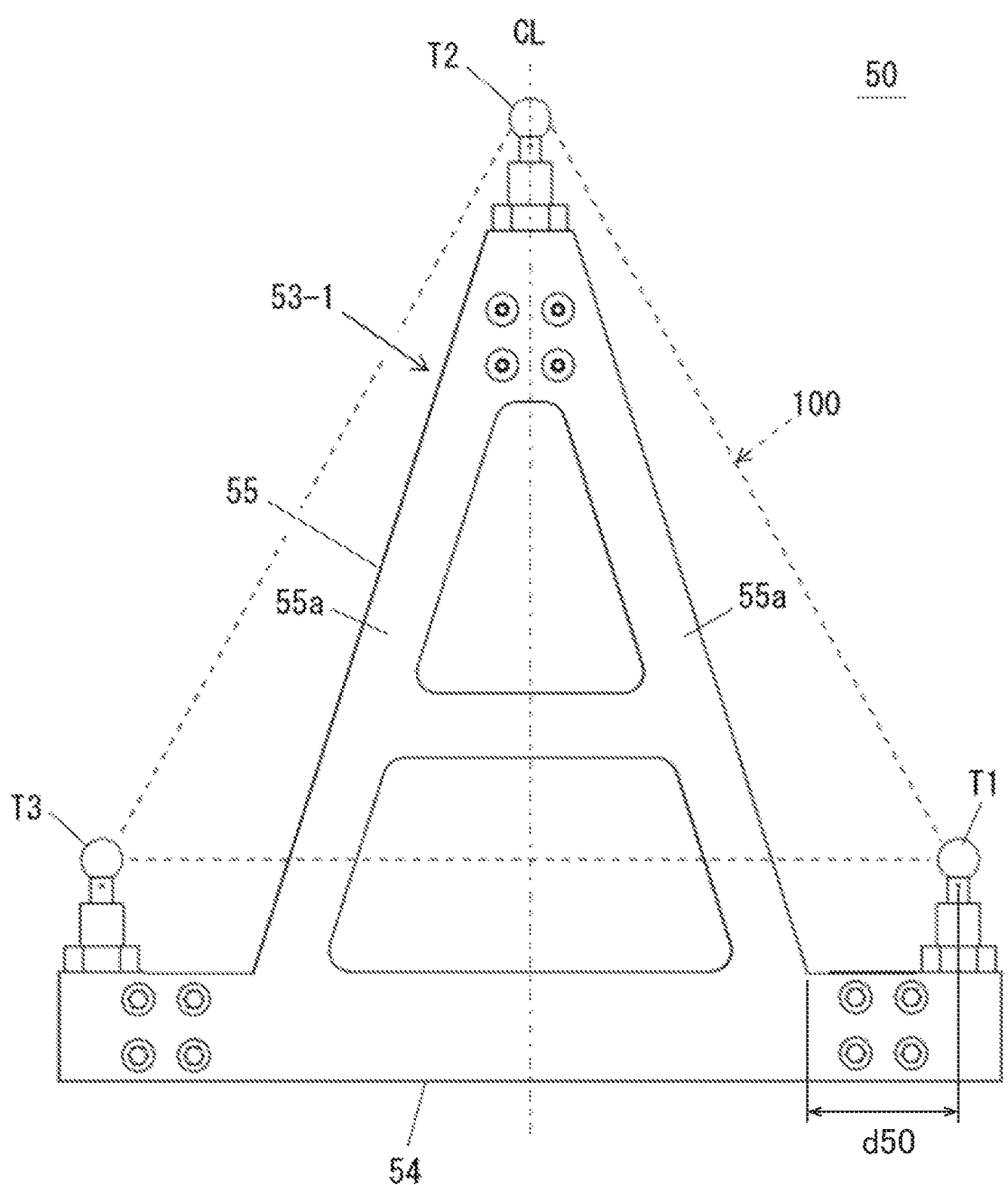
FIG. 7 is a left side view of the inspection gauge.
Figure 8:
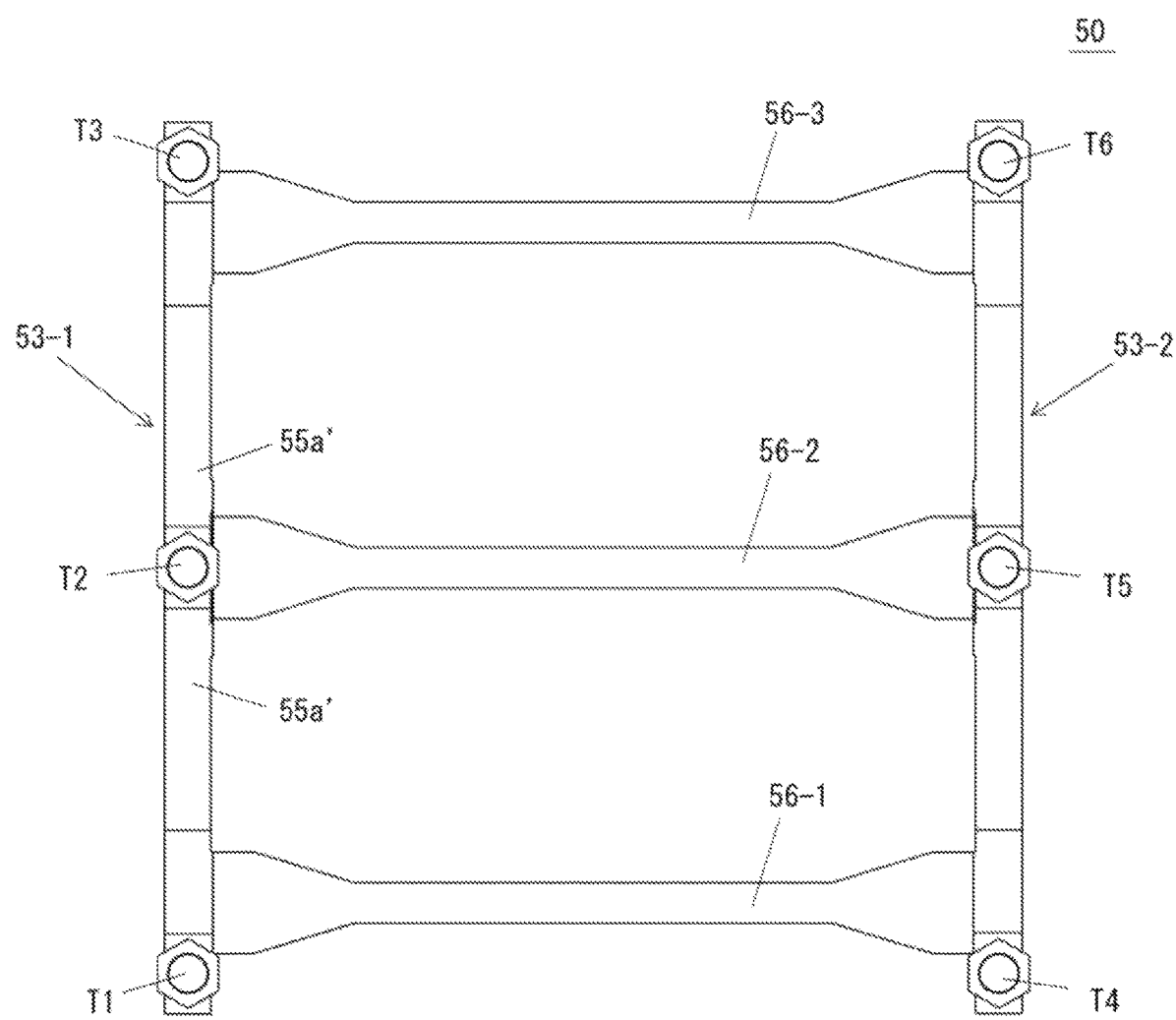
FIG. 8 is a plan view of the inspection gauge.

The three-dimensional-measuring-apparatus inspection gauge 50 according to one embodiment of the present invention is explained below. FIG. 4 is a perspective view showing the appearance of the inspection gauge 50. FIG. 5 is a figure for explaining a sphere T. FIG. 6 is a front view of the inspection gauge 50. FIG. 7 is a left side view of the inspection gauge 50. FIG. 8 is a plan view of the inspection gauge 50.

The inspection gauge 50 includes the plurality of spheres T1 to T6 (also referred to as "spheres T"), and a frame member 51. In this embodiment, the spheres T1-T6 are placed at each vertex of a triangular prism in which one of the side surfaces of the triangular prism faces to a lower surface side of the frame member 51 (triangular prism in the state shown in FIG. 4). The frame member 51 is a member supporting the spheres T. The inspection gauge 50 is a tool that is used in a state where it is arranged on the table 2 of the three-dimensional measuring apparatus 1 when an inspection of the three-dimensional measuring apparatus 1 is performed. The inspection gauge 50 can be used for both the simple inspection in which measurement of the spheres T is performed in a state where the probe 25 is caused to point a predetermined direction, whereas the detailed inspection in which measurement of the spheres T is performed while the position of the probe 25 is changed to point a plurality of directions.

As shown in FIG. 5, the plurality of spheres T are to-be-measured members with which the tip of the probe 25 of the three-dimensional measuring apparatus 1 comes into contact. The three-dimensional measuring apparatus 1 performs operation of measuring a sphere T in a state where the probe 25 is caused to assume a position in which it points downward in the Z-axis direction ((i) in the figure), and operation of measuring a sphere T in a state where the probe 25 is caused to assume a position in which it is inclined to the Z-axis direction ((ii) in the figure). For example, each sphere T is formed of the same material and in the same shape. Although a sphere T is described as an example below, the target is not necessarily limited to a sphere, but can be any three-dimensional shape that enables a representative point to be measured.

Each sphere T may be supported directly by the frame member 51, but, in the present embodiment, is supported by the frame member 51 via a support member 41. As an example, the support member 41 is a rod-like member that extends upward in the Z-axis direction in a state where the inspection gauge 50 is placed on the table 2. In this example, the support member 41 has a shaft section 41a having a diameter which is smaller than the diameter of the sphere T, and supporting the lower part of the sphere T.

Each sphere T is supported by the support member 41 in such a manner that its surface area C1 including an area above a horizontal plane H passing through the center of the sphere T and an area below the horizontal plane H does not contact other members. In this example, the area C1 is an area other than a portion which is part of the sphere T and is supported by the shaft section 41a. The sphere T supported by the support member 41 as described above allows the tip of the probe 25 to touch the entire area C1.

As shown in FIG. 4, the frame member 51 supports a first sphere T1, a second sphere T2, a third sphere T3, a fourth sphere T4, a fifth sphere T5 and a sixth sphere T6 as the plurality of spheres T. The frame member 51 having the six spheres T1 to T6 allows the three-dimensional measuring apparatus 1 to measure a large number of parameters for estimating motion error precision at a time of inspection of the three-dimensional measuring apparatus 1.

The first sphere T1, the second sphere T2 and the third sphere T3 are positioned at positions corresponding to the vertices of a triangle 100a forming one bottom surface of a triangular prism 100 (in FIG. 4, the triangular prism 100 is drawn in a state where the triangular prism lies down). The fourth sphere T4, the fifth sphere T5 and the sixth sphere T6 are positioned at positions corresponding to the vertices of a triangle 100b forming the other bottom surface of the triangular prism 100 corresponding to the spheres T1 to T3. Specifically, in this example, the spheres T1, T3, T4 and T6 are provided at the same height, whereas the spheres T2 and T5 are provided at the same height at position which is apart upward from the other spheres by a predetermined distance. In this example, the bottom surfaces of the triangular prism 100, corresponding to triangles 100a and 100b, are perpendicular to the mounting surface.

For example, the triangular prism 100 may be a regular triangular prism whose triangles 100a and 100b have equal side lengths. Specifically, the triangular prism 100 may have a shape in which the triangles 100a and 100b have equal side lengths, and the height of the triangular prism (Y-axis length in the figure) also is equal to the side lengths of the triangles 100a and 100b. In this configuration, the plurality of spheres T are located at equal intervals from each other.

(Details of Structure of Frame Member)

As shown in FIG. 4, the frame member 51 has a first frame 53-1, a second frame 53-2 and coupling members 56-1 to 56-3. In the example of FIG. 4, the frame member 51 is composed of multiple members, however the frame member 51 may be a single member integrally formed of a first frame portion corresponding to the first frame 53-1, a second frame portion corresponding to the second frame 53-2 and connecting member portions that connects the frame portions. Such a member may be formed for example by a three-dimensional printer.

The first frame 53-1 is positioned at a position corresponding to the triangle 100a which is one bottom surface of the triangular prism 100. The second frame 53-2 is positioned at a position corresponding to the triangle 100b which is the other bottom surface of the triangular prism 100. For example, each of the first frame 53-1 and the second frame 53-2 is a single member formed of a metal material and has substantially identical shape. The first frame 53-1 is explained mainly below, and the same explanation about the second frame 53-2 is omitted.

As shown in FIG. 7, the first frame 53-1 has a base section 54 and an upright section 55. For example, the first frame 53-1 has a left-right symmetric shape about a central axis CL in the Z-axis direction.

As an example, the base section 54 is a rod-like portion extending straight in the horizontal direction and having a rectangular cross-sectional shape. For example, the base section 54 has, at its both ends, support sections that support spheres T. As an example, the lower surface of the base section 54 is a flat surface. Specifically, the base section 54 supports the first sphere T1 on the upper surface of one end and the second sphere T2 on the upper surface of the other end.

The upright section 55 extends from the base section 54 upward in the Z-axis direction. As shown in FIG. 7, the upright section 55 has an isosceles triangle shape in which oblique sides 55a and 55a are left-right symmetric about the central axis CL.

As shown in FIG. 8, each oblique side 55a has inclined surfaces 55a'. Each inclined surface 55a' is a flat surface facing upward from the three-dimensional-measuring-apparatus inspection gauge 50. In a case that the inclined surface 55a' is formed as a flat surface in this manner, there is an advantage that the probe 25 of the three-dimensional measuring apparatus 1 is less likely to be damaged even if the probe 25 moves downward in the Z-axis direction toward the inspection gauge 50 with momentum for some cause and hits the inclined surface 55a'. In one example, a distance d50 from the sphere T1 to the lower end of the oblique side 55a of the upright section 55 is longer than 10%, and more specifically is longer than 15%, of the distance between the centers of the sphere T1 and sphere T3.

For example, all of the first coupling member 56-1, the second coupling member 56-2 and the third coupling member 56-3 (also referred to as coupling members 56) are formed of a metal material and have identical shapes. The coupling members 56 are members for coupling the first frame 53-1 and the second frame 53-2. As an example, the coupling members 56 are rod-like members extending straight in the Y-axis direction. For example, the lower surfaces of the coupling members 56 are flat surfaces, and the lower surfaces of the coupling members 56 may be positioned flush with the lower surfaces of the base sections 54 or may be positioned above the lower surfaces of the base sections 54.

The first coupling member 56-1 couples a portion near a first-sphere-T1 support section of the first frame 53-1 and a portion near a fourth-sphere-T4 support section of the second frame 53-2. The second coupling member 56-2 couples a portion near a second-sphere-T2 support section of the first frame 53-1 and a portion near a fifth-sphere-T5 support section of the second frame 53-2. The third coupling member 56-3 couples a portion near a third-sphere-T3 support section of the first frame 53-1 and a portion near a sixth-sphere-T6 support section of the second frame 53-2. According to such configuration, the pair of the frames 53-1 and 53-2 are coupled by the three coupling members 56 at portions near the support sections supporting the spheres T, and so the frame member 51 can support the spheres T with high positional precision. Note that, in a configuration for example in which two spheres are supported on the ends of the elongated member respectively, "portion near a support section" mean not a central section but a portion near an end of the member in the lengthwise direction. Specifically, as an example, a "portion near the support section" also includes an area which is apart from a sphere support section by a length which is equal to 20% of the distance between spheres.

(Relationship Between Shape of Inspection Gauge 50 and Space where Probe 25 Moves)

Figure 9:
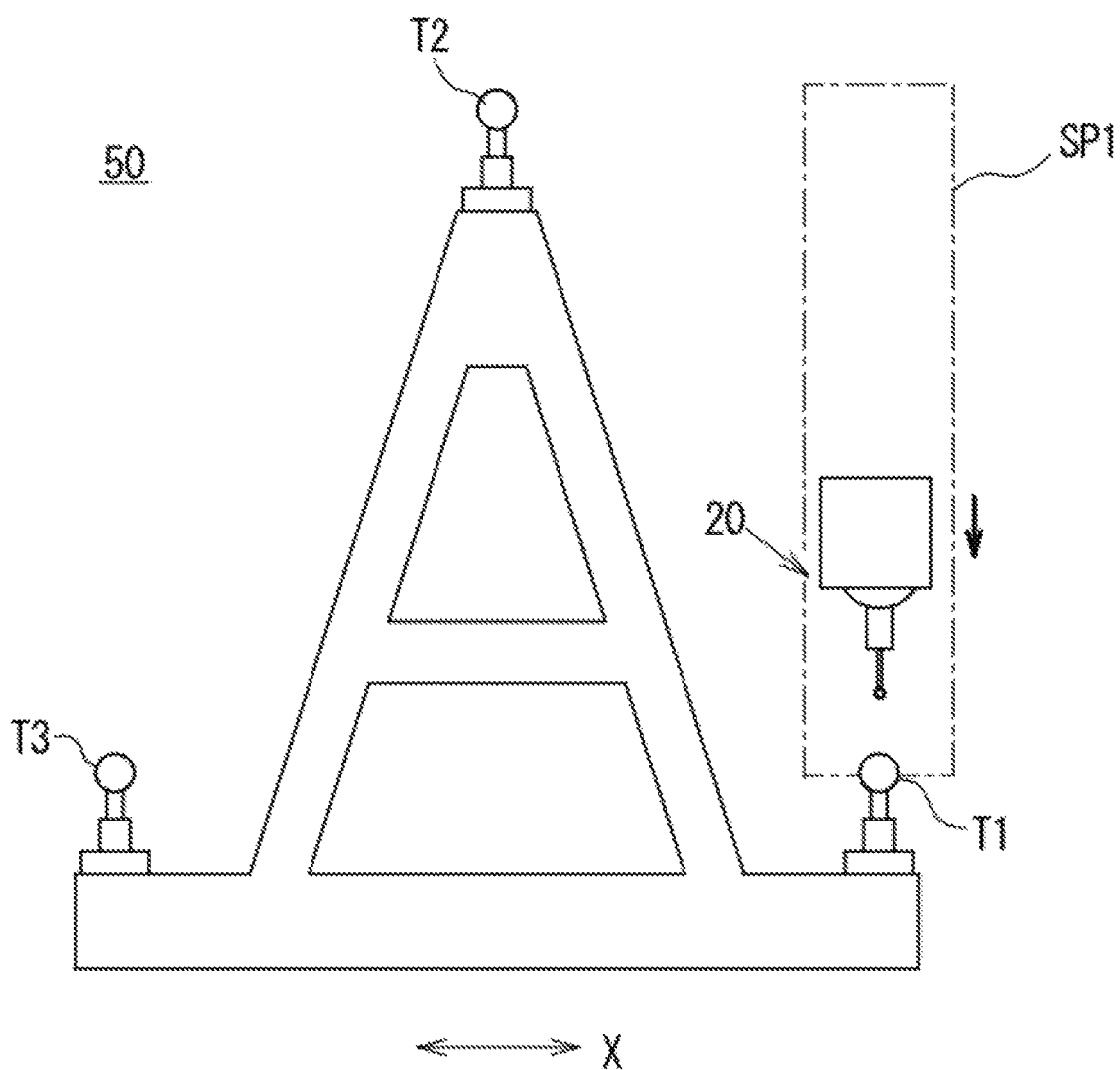
FIG. 9 is a figure for explaining a relationship between the shape of the inspection gauge and a space where the probe moves.
Figure 10:
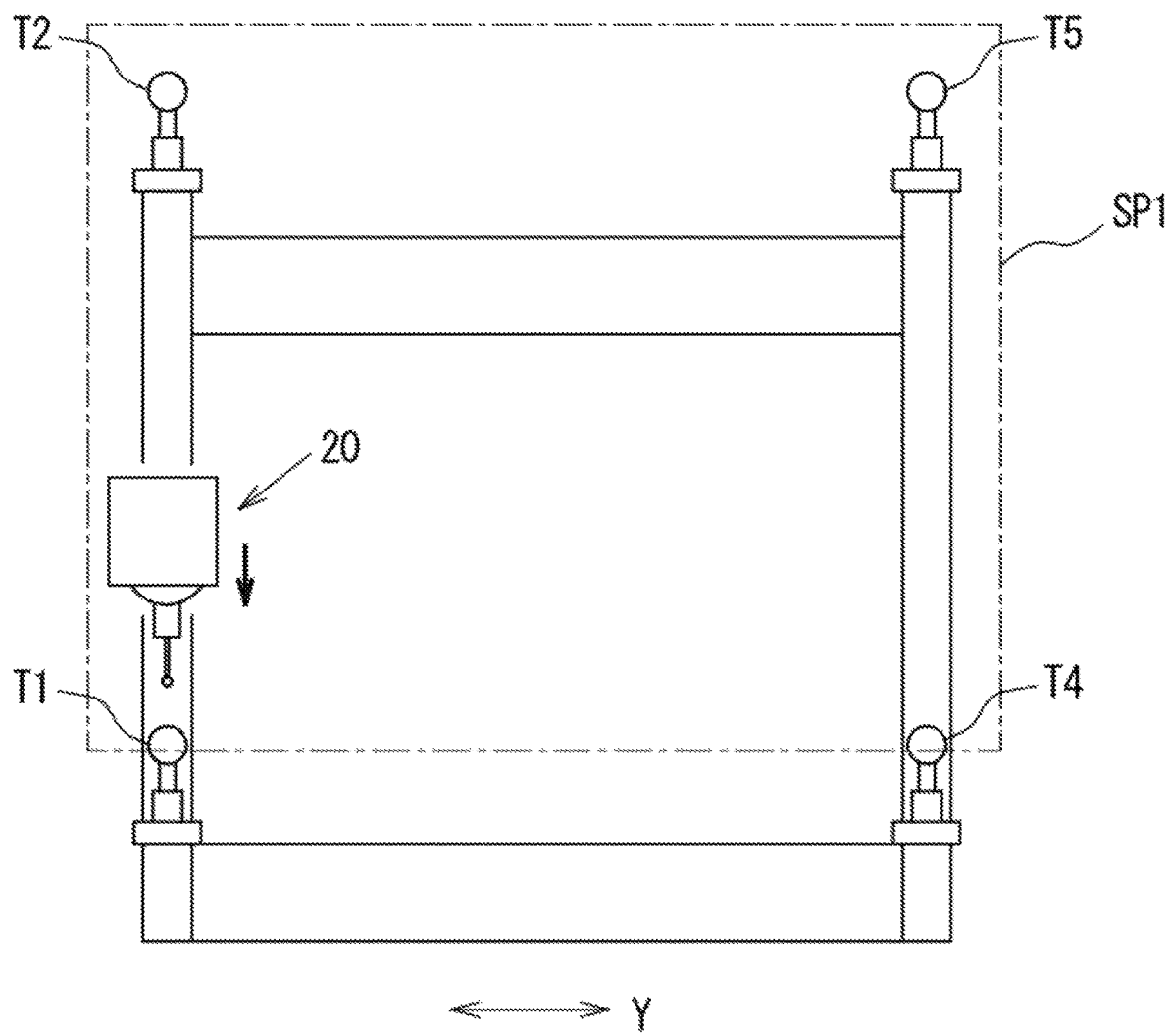
FIG. 10 is a figure for explaining a relationship between the shape of the inspection gauge and a space where the probe moves.
Figure 11:
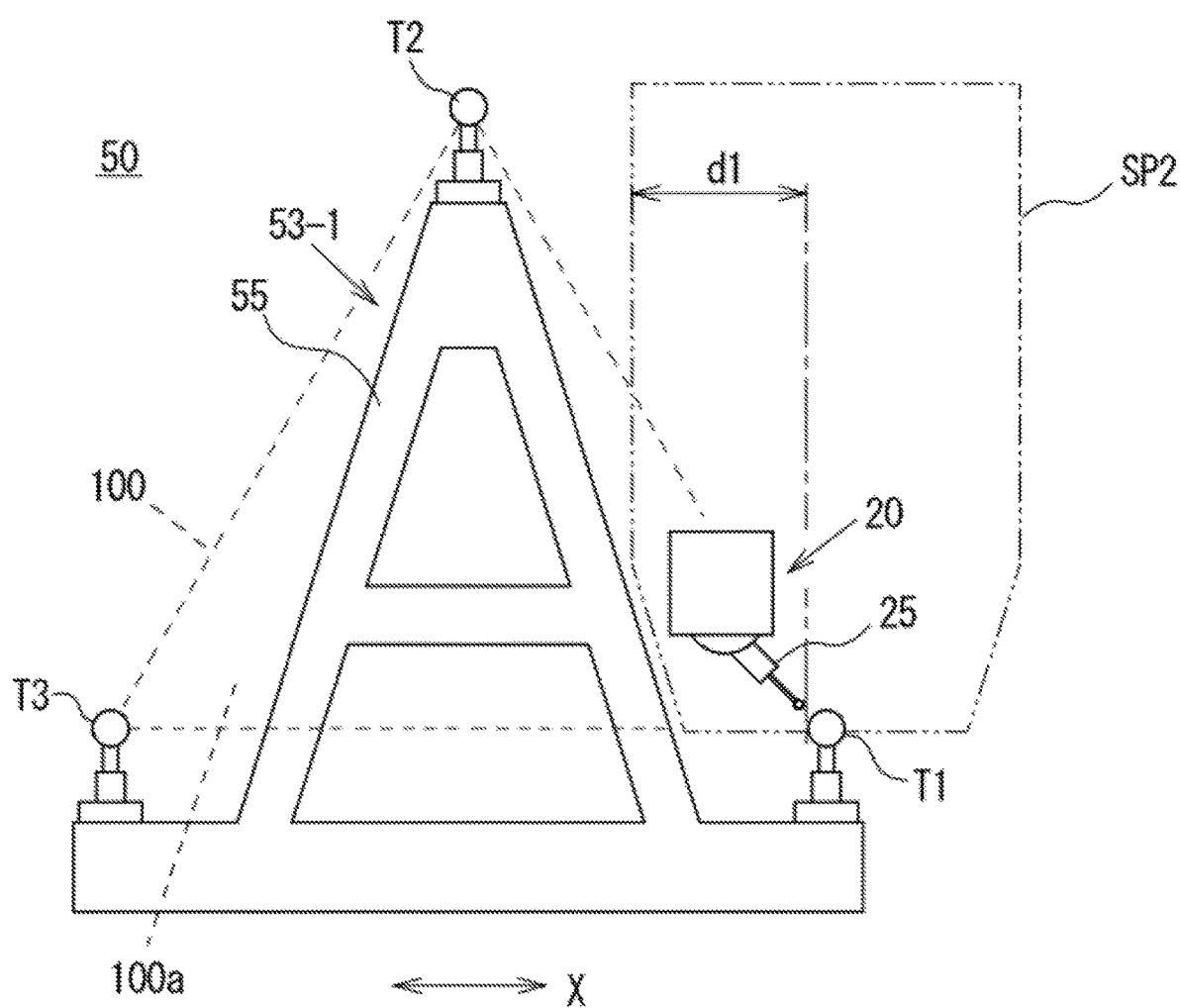
FIG. 11 is a figure for explaining a relationship between the shape of the inspection gauge and a space where the probe moves.
Figure 12:
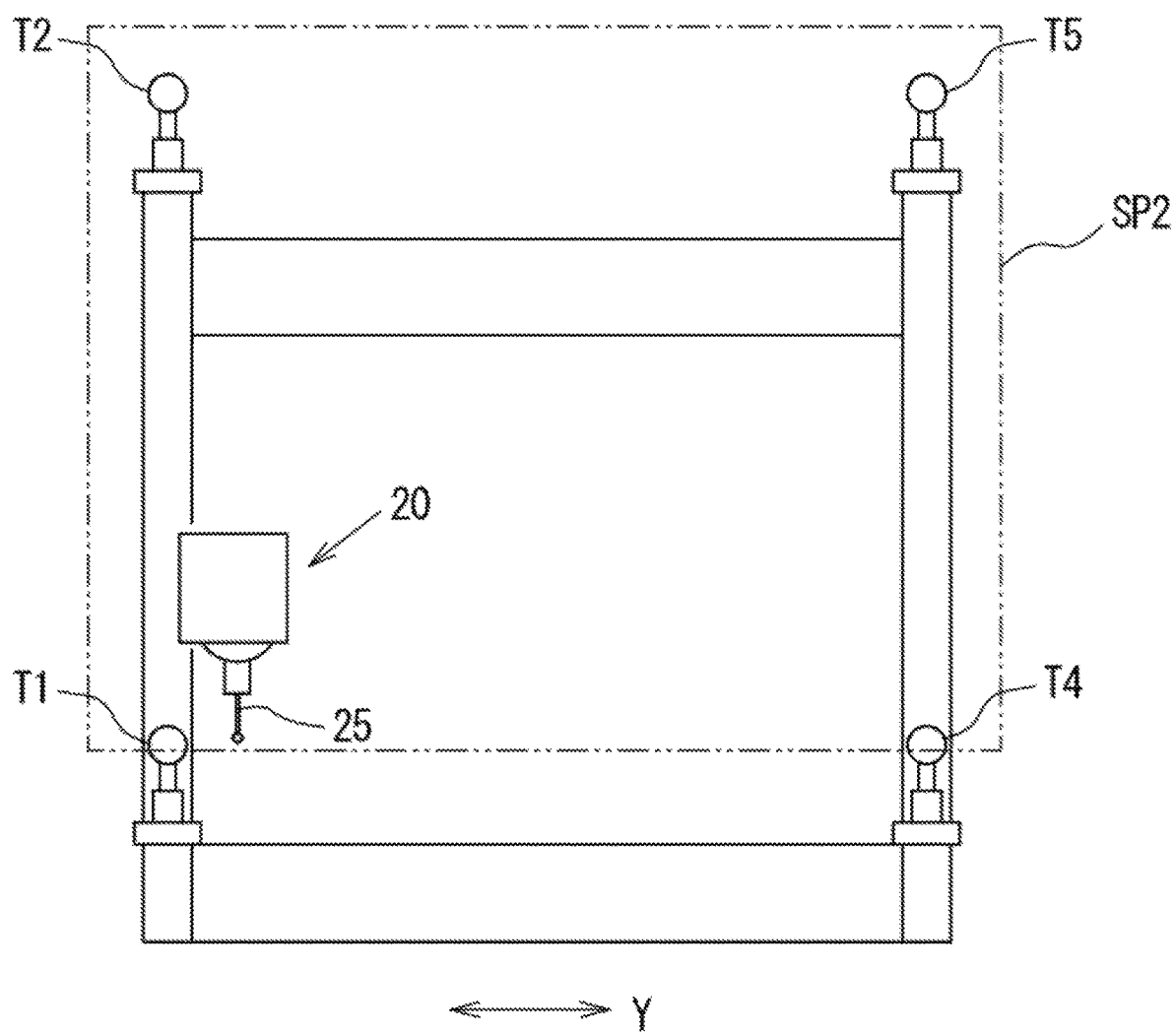
FIG. 12 is a figure for explaining a relationship between the shape of the inspection gauge and a space where the probe moves.

FIG. 9 and FIG. 10 are figures for explaining a relationship between the shape of the inspection gauge 50 and a space where the probe unit 20 moves (simple inspection). Similarly, FIG. 11 and FIG. 12 are figures for explaining a relationship between the shape of the inspection gauge 50 and a space where the probe 25 moves (detailed inspection).

The inspection gauge 50 formed in a shape like the one mentioned above forms a first space SP1 in an area above spheres T as shown in FIG. 9 and FIG. 10 (only a space above the spheres T1 and T4 is depicted in the figures).

The first space SP1 is a space for allowing the probe unit 20 to approach the spheres T in a state where the probe 25 is caused to assume a position in which it points the direction of the elevation angle of 0°, and no member of the frame member 51 is present in the first space SP1. Such a first space SP1 being formed above the spheres T allows the three-dimensional measuring apparatus 1 to perform the simple inspection with the inspection gauge 50.

Regarding details of the shape of the first space SP1, the first space SP1 has an X-axis length (see FIG. 9) which is longer than the outer shape of the probe unit 20 in the X-axis direction, for example.

The first space SP1 is formed to have a Y-axis length (see FIG. 10) which is longer than a distance from the first sphere T1 to the fourth sphere T4 (in one example, the distance between the farthest points of the first sphere T1 and fourth sphere T4). The first space SP1 being formed in an area from the first sphere T1 to the fourth sphere T4 in this manner allows the probe unit 20 to move in the Y-axis direction in the first space SP1 and perform measurement of the fourth sphere T4 directly after performing measurement of the first sphere T1, for example.

Note that although the first space SP1 corresponding to the first sphere T1 and the fourth sphere T4 is described as an example, first spaces SP1 similar to the one described above are also formed in an area from the second sphere T2 to the fifth sphere T5 and an area from the third sphere T3 to the sixth sphere T6.

Next, as shown in FIG. 11 and FIG. 12, the inspection gauge 50 forms a second space SP2 in an area above spheres T (only a space above the spheres T1 and T4 is shown in the figures).

As an example, the second space SP2 is a space that allows the probe unit 20 to approach the spheres T and the like from above and from a lateral side in a state where the probe 25 is caused to assume a position in which it points the direction of the elevation angle of 45° or 90°. No members of the frame member 51 is present in the second space SP2.

As shown in FIG. 11, the second space SP2 is formed in such a shape that the probe unit 20 can approach the sphere T1 from the inner-space side of the triangular prism 100. Specifically, in this example, the upright section 55 of the first frame 53-1 is formed such that the X-axis direction width of the upright section 55 is slightly smaller than the width of the triangle 100a of the triangular prism 100. Accordingly, the second space SP2 is formed not only in the area directly above the sphere T1, but also in an area inside the triangular prism 100. As a result, it is possible to allow the probe unit 20 to move in the X-axis direction relative to the sphere T1 from the inner-space side of the triangular prism 100 to thereby cause the tip of the probe 25 to contact the sphere T1.

More specifically, the second space SP2 has an X-axis length (a length "di" between the sphere T1 and a triangular-prism-100-side plane of the second space SP2) which is longer than the outer shape of the probe unit 20 in the X-axis direction, for example. The second space SP2 configured as above allows the probe unit 20 to move in the X-axis direction from the inner-space side of the triangular prism 100 toward the sphere T1.

The second space SP2 is formed to have a Y-axis length (see FIG. 12) which is longer than a distance from the first sphere T1 to the fourth sphere T4, similarly to the first space SP1. The second space SP2 being formed in an area from the first sphere T1 to the fourth sphere T4 in this manner allows the probe unit 20 to move in the Y-axis direction in the second space SP2, and perform measurement of the fourth sphere T4 directly after performing measurement of the first sphere T1 in a state where the probe 25 is at the elevation angle of 45° or 90°, for example.

Although the second space SP2 for the first sphere T1 and the fourth sphere T4 is described as an example, second spaces SP2 similar to the one described above are also formed in an area from the second sphere T2 to the fifth sphere T5 and an area from the third sphere T3 to the sixth sphere T6.

(Three-Dimensional-Measuring-Apparatus-1 Inspection Method)

Figure 13:
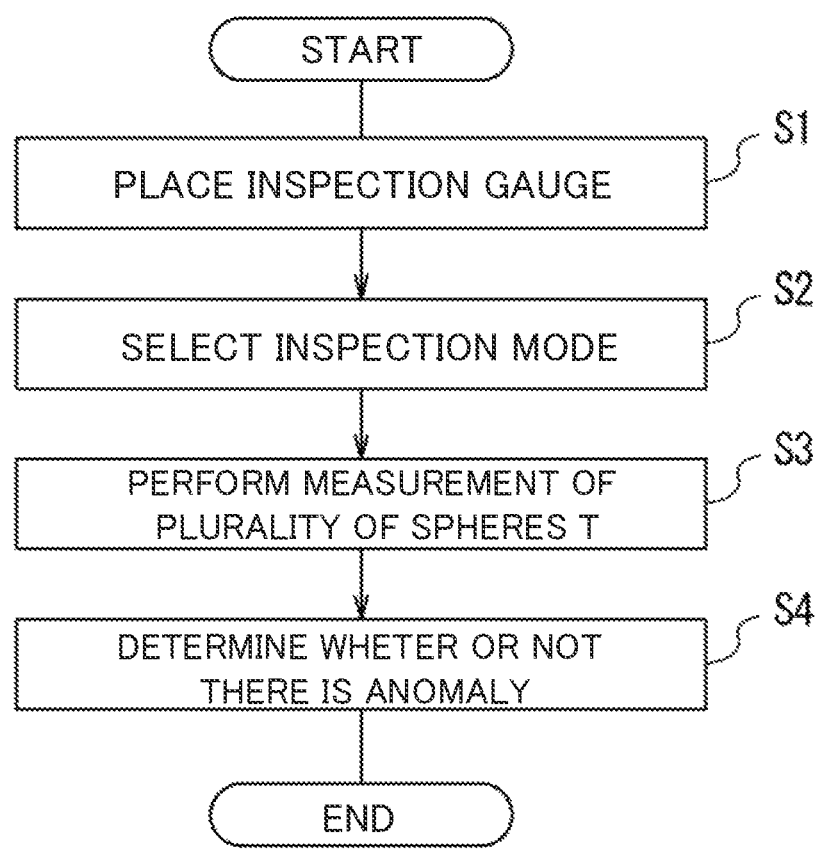
FIG. 13 is a flowchart of a three-dimensional-measuring-apparatus inspection method using the inspection gauge.

FIG. 13 is a flowchart of a three-dimensional-measuring-apparatus-1 inspection method using the inspection gauge 50. One example of inspection operation of the three-dimensional measuring apparatus 1 is explained below.

First, at Step S1, an operator who inspects the three-dimensional measuring apparatus 1 places the inspection gauge 50 at a predetermined position on the table 2. Specifically, the operator places the inspection gauge 50 at the predetermined position on the table 2 referring to a position indication part formed on the table 2 as a reference point. For example, the inspection gauge 50 is arranged on the table 2 of the three-dimensional measuring apparatus 1 in such a direction that the extending direction of the coupling members 56 of the inspection gauge 50 coincides with the Y-axis direction in the coordinate system of the three-dimensional measuring apparatus 1.

Basically, the inspection gauge 50 may be placed at any position on the table 2. Since measurement is performed in a state where the direction of the probe 25 has been changed to different positions in the second inspection mode, as an example, the inspection gauge 50 is preferably placed at the center of the coordinate system of the three-dimensional measuring apparatus 1. In some case, a user might place a work in an end area of the measurement space of the three-dimensional measuring apparatus 1 when the measurement is carried out. In such a case, the user may place the inspection gauge 50 at a position where she/he usually places a work for inspection.

At Step S2, for example, the operator inputs to the three-dimensional measuring apparatus 1 an instruction as to which type of inspection operation is to be implemented via a user interface displayed on the display section of the three-dimensional measuring apparatus 1. For example, the operator selects the simple inspection, which is an inspection in the first inspection mode, or the detailed inspection, which is an inspection in the second inspection mode.

At Step S3, the operation control section 331 of the three-dimensional measuring apparatus 1 causes the three-dimensional measuring apparatus 1 to perform either the first-mode inspection operation or the second-mode inspection operation based on a selection for the inspection mode by the operator. The three-dimensional measuring apparatus 1 measures the to-be-measured distances, which are the distances between the spheres T1 to T6 of the inspection gauge 50 by causing the tip of the probe 25 to contact the six spheres T1 to T6 of the inspection gauge 50. Specifically, for example, in a case that an instruction for selecting the first inspection mode is received, the three-dimensional measuring apparatus 1 measures the to-be-measured distances, which are the distances between the plurality of spheres T by causing the probe 25 to contact the spheres T while the probe 25 is at a predetermined position (pointing downward in the Z-axis direction).

At Step S4, the measurement data processing section 332 of the three-dimensional measuring apparatus 1 determines whether or not the measured to-be-measured distances are within the predetermined appropriate range, and determines whether or not there is an anomaly of the three-dimensional measuring apparatus 1. In a case that it is determined that there is an anomaly, the display processing section 333 causes the display section which is not shown to display information to that effect. In addition, in a case that it is determined that there is an anomaly, the operation control section 331 may automatically switch the inspection mode from the first inspection mode to the second inspection mode, and cause the three-dimensional measuring apparatus 1 to perform operation of the detailed inspection.

Although measurement of the six spheres T1 to T6 can be performed in any order in the second inspection mode (detailed inspection), for example the operation control section 331 may move the probe 25 such that measurement is performed in the order of the first sphere T1, the fourth sphere T4, the second sphere T2, the fifth sphere T5, the third sphere T3 and the sixth sphere T6 at a certain probe position. Thereafter, the three-dimensional measuring apparatus 1 may perform measurement of the all spheres T1 to T6 continuously in the same order as that described above at another probe position. In a case that the spheres T1 to T6 are measured continuously, influence of positioning errors of the probe 25 can be reduced.

In addition, regarding the position of the probe 25, for example in a case that measurement of a sphere T is performed in a state where the probe 25 is caused to assume a position with the elevation angle of 45° and the azimuth of 90° (e.g. the positive direction along the X axis in FIG. 4), measurement of the sphere T may also be carried out at a position with the elevation angle of 45° and the azimuth of −90° (e.g. the negative direction along the X axis in FIG. 4) corresponding to the angles of 45° and the azimuth of 90°.

Advantageous Effects

Although conventional gauges cannot be used for both the simple inspection, which is a daily inspection, and the detailed inspection of the three-dimensional measuring apparatus 1, the inspection gauge 50 according to present embodiment can be used for both the simple inspection and the detailed inspection for the three-dimensional measuring apparatus 1. In addition, the inspection gauge 50 according to the present embodiment enables the probe 25 to approach the spheres T from the inner-space side of the triangular prism. Accordingly, for example, measurement of the spheres T on the same plane in the three-dimensional measuring apparatus space (for example, the spheres T1 and T4) can be performed with the probe 25 at different positions; therefore, high motion error estimation precision can be achieved. Accordingly, the precision of inspection of the three-dimensional measuring apparatus using the inspection gauge (particularly, inspections using motion errors as an indicator) can be enhanced.

According to the configuration of the present embodiment, the first frame 53-1 supports the three spheres T1 to T3. It is conceivable that the spheres T are supported not only by the first frame 53-1 but also by the coupling members 56. It should be noted that according to configuration like the one in the present embodiment, the spheres T can be supported with high positional precision without being influenced by assembly-related dimensional errors of the first frame 53-1 and the coupling members 56. Similar advantageous effects can also be achieved with the second frame 53-2. Furthermore, assembly-related dimensional errors of a plurality of members do not occur in a case that the first frame 53-1 and the second frame 53-2 are formed of a single member, and so the positional precision of the spheres T is enhanced further.

Although the present inventions have been explained referring to an embodiment thus far, the technical scope of the present invention is not limited by the scope described in the embodiment described above, but various modifications and changes are possible within the scope of the gist of the present invention. For example, the frame member is not limited to the specific shape shown in the drawings of the above embodiment. The frame member is not limited to a frame configuration but may be any supporting structure.

Instead of configuration like the one mentioned above having the base sections 54 and the upright sections 55 having isosceles triangle shapes, the frames 53-1 and 53-2 of the frame member 51 may be configured such that they have the base sections 54 and rod-like members extending vertically upward out from the base sections 54. As an example, the rod-like members may extend perpendicularly upward from the base sections 54.

Although the three-dimensional measuring apparatus 1 including the table 2 is described as an example in the embodiment described above, the three-dimensional-measuring-apparatus inspection gauge 50 of the present invention can be used in a three-dimensional measuring apparatus having no table 2 is, where a work is placed on a predetermined mounting surface such as the ground, for example. An inspection gauge for three-dimensional measuring apparatus according to the embodiments of the present invention may include a plurality of the targets to be measured that are disposed at each vertex of a triangular prism with one of the side surfaces facing the bottom surface of the frame member. This configuration enables inspection of three-dimensional measuring apparatus with greater precision than conventional triangular pyramid-type gauges. In one embodiment of this configuration, it is preferable that a space in which the probe unit 20 can move is formed between a certain target (e.g., sphere T2) on one bottom surface of the triangular prism and a corresponding target (e.g., sphere T5) on the other bottom surface. The same applies to the spaces between spheres T1 and T4 and between spheres T3 and T6.

Figure 14:
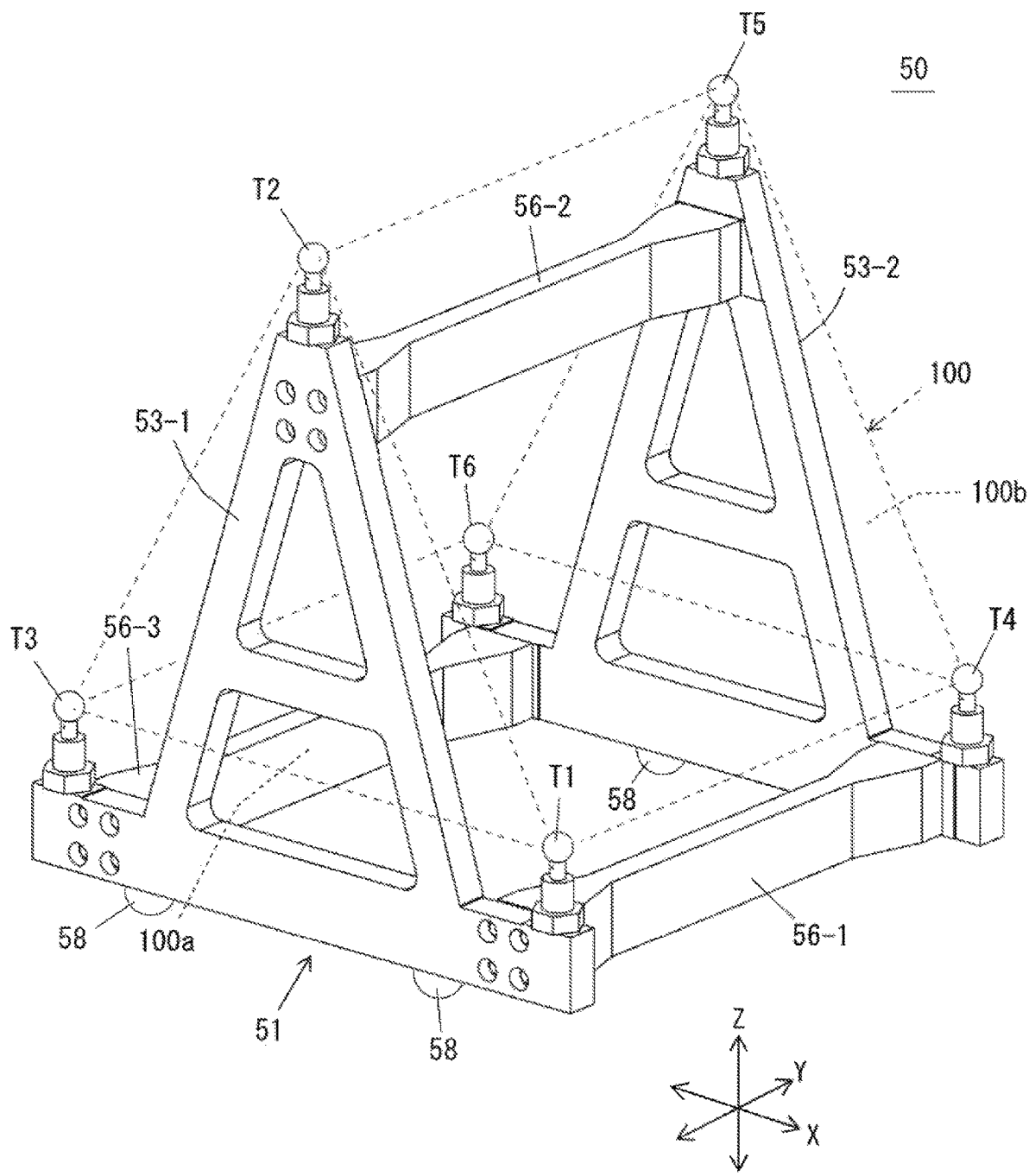
FIG. 14 is a figure showing one modified example of a three-dimensional-measuring-apparatus inspection gauge.

FIG. 14 is a figure showing one modified example of a three-dimensional-measuring-apparatus inspection gauge. As shown in FIG. 14, the frame member 51 may have three supporting parts 58 that support the three-dimensional-measuring-apparatus inspection gauge 50 for the three-dimensional measuring apparatus when the the inspection guage 50 is placed on the table of the three-dimensional measuring apparatus 1. The supporting part 58 may be any shape having a tip end that makes point contact with the surface of the table. The supporting parts 58 may be provided on the lower surface of the base section 54. As an example, two supporting parts 58 may be provided on one base portion 54 and one support 58 is provided on the other base section 54. The three supporting parts 58 may be positioned at the corners of an equilateral triangle.

Regarding changes and modifications of the present invention, for example, an apparatus can be entirely or partially configured in a functionally or physically distributed/integrated manner in any units. In addition, new embodiments generated by any combinations of a plurality of embodiments are also included in embodiments of the present invention. Advantageous effects of the new embodiments generated by the combinations have combinations of advantageous effects of the original embodiments.

DESCRIPTION OF REFERENCE CHARACTERS

1: Three-dimensional measuring apparatus
2: Table
10: Moving mechanism
11: Column
12: Supporter
13: Beam
14: Y-axis-direction driving section
15: Slider
20: Probe unit
23: Z-axis spindle
24: Position changing mechanism
25: Probe
30: Control unit
31: Interface section
32: Storage section
33: Control section
41: Support member
41a: Shaft section
50: Three-dimensional-measuring-apparatus inspection gauge
51: Frame member
53-1: First frame
53-2: Second frame
54: Base section
55: Upright section
55a: Oblique side
55a': Inclined surface
56: Coupling member
100: Triangular prism
100a: Triangle
100b: Triangle
331: Operation control section
332: Measurement data processing section
333: Display processing section
SP1: First space
SP2: Second space
T: Sphere

The invention claimed is:

1. A three-dimensional-measuring-apparatus inspection gauge comprising:
a plurality of targets to be measured with which a tip of a probe of a three-dimensional measuring apparatus comes into contact; and
a frame member that supports the plurality of targets, wherein
the plurality of targets are arranged in positions corresponding to each vertex of a triangular prism.

2. The three-dimensional-measuring-apparatus inspection gauge according to claim 1, wherein
the frame member supports the plurality of targets such that a first target, a second target and a third target are positioned at vertices of a triangle forming one bottom surface of a triangular prism, whereas a fourth target, a fifth target and a sixth target are positioned at vertices of a triangle forming the other bottom surface of the triangular prism corresponding to the positions of the first target, the second target and the third target, respectively; and
such that spaces are formed in areas above the targets so that the probe unit can approach the targets from above while the probe is at a position in which the probe extends in a direction perpendicular to the mounting surface of the three-dimensional measuring apparatus on which a work is placed; and
such that spaces where the probe unit moves are formed in an area from the first target to the fourth target, an area from the second target to the fifth target and an area from the third target to the sixth target so as to allow the probe to approach the targets from an inner-space side of the triangular prism while the probe is at a position in which the probe extends in a direction crossing the perpendicular direction.

3. The three-dimensional-measuring-apparatus inspection gauge according to claim 2, wherein
the frame member has:
a first frame positioned at a position corresponding to the one bottom surface of the triangular prism;
a second frame positioned at a position corresponding to the other bottom surface of the triangular prism; and
a coupling member that couples the first frame and the second frame,
the first frame supports the first target, the second target and the third target, and
the second frame supports the fourth target, the fifth target and the sixth target.

4. The three-dimensional-measuring-apparatus inspection gauge according to claim 3, wherein
the coupling member has:
a first coupling member that couples a portion near a first-target support section of the first frame and a portion near a fourth-target support section of the second frame;
a second coupling member that couples a portion near a second-target support section of the first frame and a portion near a fifth-target support section of the second frame; and
a third coupling member that couples a portion near a third-target support section of the first frame and a portion near a sixth-target support section of the second frame.

5. The three-dimensional-measuring-apparatus inspection gauge according to claim 3, wherein
each of the first frame and the second frame has:
a base section that extends in a horizontal direction, and supports targets at both ends thereof; and
an upright section that extends upward from the base section, and supports a target at a top section thereof, and
the first frame and the second frame are formed of a single member.

6. The three-dimensional-measuring-apparatus inspection gauge according to claim 5, wherein the upright section is formed in an isosceles triangle shape having a pair of oblique sides.

7. The three-dimensional-measuring-apparatus inspection gauge according to claim 6, wherein
each of the oblique sides has a inclined surface facing upward from the three-dimensional-measuring-apparatus inspection gauge, and
the inclined surface is a flat surface.

8. The three-dimensional-measuring-apparatus inspection gauge according to claim 1, wherein each target is positioned at a position corresponding to a vertex of a regular triangular prism, and the plurality of targets are arranged at equal intervals from each other.

9. The three-dimensional-measuring-apparatus inspection gauge according to claim 1, wherein
the frame member has three supporting portions for supporting the three-dimensional-measuring-apparatus inspection gauge when the three-dimensional-measuring-apparatus inspection gauge is placed on the mounting surface.

10. The three-dimensional-measuring-apparatus inspection gauge according to claim 2, wherein the frame member is formed of a single member including a first frame portion positioned at a position corresponding to the one bottom surface of the triangular prism; a second frame portion positioned at a position corresponding to the other bottom surface of the triangular prism; and a coupling member portion that couples the first frame potion and the second frame potion.

11. A three-dimensional-measuring-apparatus inspection method comprising:
a step of placing, on mounting surface of a three-dimensional measuring apparatus on which a work is placed, a three-dimensional-measuring-apparatus inspection gauge comprising a plurality of targets to be measured with which a tip of a probe of a three-dimensional measuring apparatus comes into contact; and a frame member that supports the plurality of targets, wherein the plurality of targets are arranged in positions corresponding to each vertex of a triangular prism;
a step at which a processor causes the three-dimensional measuring apparatus to measure to-be-measured distances which are distances between a plurality of targets of the three-dimensional-measuring-apparatus inspection gauge; and
a step at which the processor determines whether or not there is an anomaly of the three-dimensional measuring apparatus on a basis of whether or not the to-be-measured distances are in a predetermined appropriate range.

12. The three-dimensional-measuring-apparatus inspection method according to claim 11, further comprising a step at which the processor receives an instruction for selecting an inspection mode, wherein in a case that an instruction for selecting a first inspection mode is received, the to-be-measured distances are measured at the step of measuring the to-be-measured distances by the processor causing the probe of the three-dimensional measuring apparatus to come into contact with the plurality of targets while the probe is at a predetermined position, and in a case that an instruction for selecting a second inspection mode different from the first inspection mode is received, the to-be-measured distances are measured at the step of measuring the to-be-measured distances by the processor causing the probe of the three-dimensional measuring apparatus to come into contact with the plurality of targets with several the probe positions.

13. A three-dimensional measuring apparatus comprising:
a table;
a probe provided to assume variable positions;
a moving mechanism that moves the probe;
a position indication part that formed on the table, and indicates a placement position for the three-dimensional-measuring-apparatus inspection gauge according to claim 1 or 2; and
a control unit that controls a position of the probe, and operation of the moving mechanism so as to measure to-be-measured distances which are distances between a plurality of targets of the three-dimensional-measuring-apparatus inspection gauge placed at the placement position, wherein
the control unit performs on a basis of selecting operation for selecting a first inspection mode or a second inspection mode either:
first-mode inspection operation in which the to-be-measured distances are measured by causing the probe of the three-dimensional measuring apparatus to come into contact with the plurality of targets while the probe is at a constant position; or
second-mode inspection operation in which the to-be-measured distances are measured by causing the probe of the three-dimensional measuring apparatus to come into contact with contact the plurality of targets while the probe is at a plurality of positions.

* * * * *